(12) United States Patent
Maltha et al.

(10) Patent No.: US 8,448,589 B2
(45) Date of Patent: May 28, 2013

(54) PROCESS TO MANUFACTURE TUFTED BACKING MATERIALS

(75) Inventors: Annemarieke Maltha, Wijchen (NL); Marcellinus C. H. Nieuwenhuizen, Duiven (NL); Edze J. Visscher, Utrecht (NL)

(73) Assignee: Bonar B.V., Arnhem (NL)

( * ) Notice: Subject to any disclaimer, the term of this patent is extended or adjusted under 35 U.S.C. 154(b) by 721 days.

(21) Appl. No.: 12/450,005

(22) PCT Filed: Apr. 19, 2008

(86) PCT No.: PCT/EP2008/003184
§ 371 (c)(1),
(2), (4) Date: Oct. 20, 2009

(87) PCT Pub. No.: WO2008/131883
PCT Pub. Date: Nov. 6, 2008

(65) Prior Publication Data
US 2010/0092721 A1   Apr. 15, 2010

(30) Foreign Application Priority Data
Apr. 27, 2007   (EP) .................................. 07008598

(51) Int. Cl.
*D05C 15/04*   (2006.01)
*D05C 15/08*   (2006.01)

(52) U.S. Cl.
USPC ............. 112/475.23; 112/475.08; 112/475.04

(58) Field of Classification Search
USPC ... 112/475.23, 475.08, 475.04, 80.01; 428/95
See application file for complete search history.

(56) References Cited

U.S. PATENT DOCUMENTS

| | | | |
|---|---|---|---|
| 2,630,620 A | 3/1953 | Rand | |
| 2,908,013 A | 10/1959 | Keen et al. | |
| 3,075,865 A | 1/1963 | Cochran | |
| 3,394,043 A * | 7/1968 | Mitchell et al. | 428/95 |
| 3,705,064 A | 12/1972 | Lochner | |
| 4,140,071 A | 2/1979 | Gee et al. | |
| 4,211,593 A | 7/1980 | Lochner | |
| 5,338,340 A | 8/1994 | Kasmark, Jr. et al. | |
| 5,494,724 A * | 2/1996 | Lang | 428/95 |
| 6,740,386 B2 * | 5/2004 | Hutchison | 428/88 |
| 7,033,661 B2 * | 4/2006 | Whitten et al. | 428/88 |
| 7,490,569 B2 * | 2/2009 | Whitten et al. | 112/475.01 |
| 7,695,794 B2 * | 4/2010 | Oosterbroek et al. | 428/95 |
| 2002/0164448 A1 * | 11/2002 | Hutchison | 428/86 |
| 2003/0175474 A1 * | 9/2003 | Higgins et al. | 428/95 |
| 2003/0175475 A1 * | 9/2003 | Higgins et al. | 428/95 |
| 2004/0253409 A1 * | 12/2004 | Whitten et al. | 428/89 |
| 2005/0233668 A1 | 10/2005 | Ogle et al. | |
| 2006/0048690 A1 * | 3/2006 | Whitten et al. | 112/475.01 |
| 2006/0216462 A1 * | 9/2006 | Lucas et al. | 428/105 |
| 2008/0241459 A1 * | 10/2008 | Higgins et al. | 428/95 |
| 2009/0081406 A1 * | 3/2009 | Higgins et al. | 428/95 |

FOREIGN PATENT DOCUMENTS

| | | |
|---|---|---|
| DE | 290 385 B5 | 12/1996 |
| JP | A-2004-261737 | 9/2004 |
| WO | WO 2005/066406 A1 | 7/2005 |

* cited by examiner

*Primary Examiner* — Cheryl Juska
(74) *Attorney, Agent, or Firm* — Oliff & Berridge, PLC

(57) ABSTRACT

A process to manufacture tufted backing materials comprises the steps of a) providing a roll bearing a backing material which backing material comprises a first side exhibiting a first colour and a second side exhibiting a second colour, wherein the first colour is different from the second colour, the first side is the front side and the second side is the rear side, b) unwinding the backing material from the roll, c) tufting the backing material, d) cutting the backing material at a position between the roll bearing the backing material and the tufting device, e) rotating the roll bearing the backing material by an angle of 180°, f) unwinding the backing material from the roll in a second unwinding direction which is opposite to the first unwinding direction and guiding the backing material into the tufting device, and g) tufting the backing material. A backing material for tufted carpets or filters comprising a first woven or non-woven layer having a second colour different from the first one is also described.

10 Claims, No Drawings

PROCESS TO MANUFACTURE TUFTED BACKING MATERIALS

The present invention pertains to a process to manufacture tufted backing materials.

Processes to manufacture tufted backing materials are known. Said processes comprise the steps of providing a backing material on a roll, unwinding the backing material from the roll and tufting in the backing material. Furthermore, it is known to use a backing material with a certain colour. If it is desired to change the colour of the backing material the roll bearing the backing with the colour which is no more desired has to be disintegrated from the tufting plant and has to be transported into the repository, another roll bearing a backing with the colour which is now desired has to be transported from the repository to the tufting plant and integrated into the tufting plant. So, changing the colour of the backing material represents a labour-intensive and time-consuming process, which of course decreases the profit of the tufter.

Even more important: In the carpet industry it is normal to have a significant colour range within one carpet style. This range can request for backings with different colours to provide the desired background in the carpet. For the tufter this means that he needs to have rolls from different colours available, increasing the total of stock items and in general stock level of raw materials.

Therefore, in manufacturing tufted backing materials with different colours of the backing material there is a strong demand to provide a process, which is less labour-intensive, less time-consuming and decreases the costs of raw material stocks.

The present invention satisfies said demand by providing a process to manufacture tufted backing materials comprising the steps of a) providing a roll bearing a backing material which backing material comprises a first side exhibiting a first colour and a second side exhibiting a second colour, wherein the first colour is different from the second colour, the first side is the front side and the second side is the rear side, b) unwinding the backing material from the roll in a first unwinding direction and guiding the backing material into a tufting device provided with tufting means, so that the first side exhibiting the first colour faces the means of the tufting device, c) tufting the backing material with the tufting means of the tufting device until a desired amount of a tufted backing material has been manufactured provided with tufts extending from the second side exhibiting the second colour, d) cutting the backing material at a position between the roll bearing the backing material and the tufting device, e) rotating the roll bearing the backing material by an angle of 180° so that the first side exhibiting the first colour is the rear side and the second side exhibiting the second colour is the front side, f) unwinding the backing material from the roll in a second unwinding direction which is opposite to the first unwinding direction and guiding the backing material into the tufting device provided with tufting means, so that the second side exhibiting the second colour faces the means of the tufting device, and g) tufting the backing material with the tufting means of the tufting device until a desired amount of a tufted backing material has been manufactured provided with tufts extending from the first side exhibiting the first colour.

So, the process of the present invention replaces the labour-intensive and time-consuming process of the prior art simply by providing a roll bearing a modified backing material, rotating said roll by 180° and changing the roll's unwinding direction.

If compared with the prior art process said replacement accelerates and simplifies the change of the backing colour and thereby increases the flexibility of the manufacture of tufted backings.

Additionally said replacement ensures that in fact that side of the backing material is tufted which shall be tufted because said side is clearly identified by a colour. This increases the safety of the tufting process and ensures the production of backing materials, which are tufted on the desired side. Said replacement makes it unnecessary to provide the desired tufting side with labels, which might get lost.

Finally, said replacement halfes the number of rolls of backing material, which have to be stored in the repository. This simplifies the logistic of the repository of a factory, which produces tufted backing materials suitable to manufacture tufted and optionally molded carpets for home textiles or for decoration or for textiles in automobiles, trains and aircrafts or for out door applications like synthetic turf or play grounds.

The backing material provided in step a) of the process of the invention can be any material which can be tufted, for example at least one layer of a woven or preferably at least one layer of a nonwoven or any suitable combination of at least one layer of woven with at least one layer of nonwoven provided that the backing material exhibits the on the front side the first colour and on the rear side the second colour. For example the backing material may comprise one layer of a woven adjacent to one layer of a nonwoven, where the layer of nonwoven exhibits e.g. the first colour and the layer of woven exhibits e.g. the second colour.

As mentioned above, preferably the backing material provided in step a) of the process of the invention comprises at least one layer of nonwoven. Depending of the conditions of the intended use the backing material provided in step a) of the process of the invention may comprise two, three or more layers of a nonwoven.

Most preferably the backing material provided in step a) of the process of the invention consists of one layer of nonwoven which exhibits the first colour on its front side and the second colour on its rear side. Such a backing material can be produced for example by first twirling a first web layer exhibiting e.g. the first colour and then twirling a second web layer onto said first web layer where the second web layer consequently exhibits the second colour.

The tufting of the backing material in step c) and g) of the process of the present invention may be performed with any suitable tufting material, wherein preferred tufting materials are selected from the group consisting of polyamide (PA), polypropylene (PP), polyethyleneterephthalate (PET), polylactic acid (PLA), wool and cotton. The colour of the tufting material used in the process of the invention may be identical or different from the first and second colour respectively of the backing material. This further increases the technical flexibility of the process of the present invention to manufacture a great variety of tufted backing materials.

The at least one layer of (non)woven being comprised in the backing material provided in step a) of the present invention comprises fibers. Within the scope of the present invention's process the term "fiber" has to be understood in its broadest sense, including mono- or multifilaments, which might be spun bond or melt blown or made by another technique known per se and which may have any cross-sectional shape, e.g. a spherical shape, a tri- or multilobal shape or a rectangular shape, the latter exhibiting a width and a height, wherein the width may be considerably larger than the height, so that the fiber in this embodiment is a tape. Said fibers may be comminuted for example by cutting or ripping to form staple fibers of a suitable length for backing materials. Furthermore, said fibres may be monocomponent fibers or multicomponent fibers. Within the scope of the present invention the term "multicomponent fibers" means bicomponent fibers or tricomponent fibers or fibers with more than three components.

In a preferred embodiment of the process of the present invention the nonwoven comprises bicomponent fibers of any known structure, wherein the two components of the bicomponent fibers are arranged for example side-by-side or One component forms islands in a sea of the other component.

In an especially preferred embodiment of the process of the present invention the bicomponent fibers are core/sheath fibers wherein the core preferably comprises a thermoplastic polymer selected from the group consisting of polyethyleneterephthalate (PET), polypropylene (PP), polyamide (PA), polybutyleneterephthalate (PBT), polytrimethyleneterephthalate (PTT), polyphenylenesulfide (PPS), polyethylenenaphthalate (PEN), polyethyleneimide (PEI), polylactic acid (PLA) and polyoxymethylene (POM).

In another especially preferred embodiment of the process of the present invention the bicomponent fibers are core/sheath fibers wherein the sheath preferably comprises a thermoplastic polymer selected from the group consisting of polyamide (PA), polypropylene (PP), polyethylene (PE) or copolymers thereof, polybutyleneterephthalate (PBT), polylactic acid (PLA) and aliphatic polyesters.

In general the polymer comprised in the core of the bicomponent fibers exhibits a melting temperature which is higher than the melting temperature of the polymer comprised in the sheath of the bicomponent fibers. Preferably said difference in melting temperatures is at least 20° C.

In the most preferred embodiment of the process of the present invention the bicomponent fibers are core/sheath fibers comprising a core of polyethyleneterephthalate, preferably with a melting temperature of 250° C. and a sheath of polyamide, preferable with a melting temperature of 220° C. or a sheath of polypropylene, preferably with a melting temperature of 160° C.

The process of the present invention enables a simplified and accelerated manufacture of tufted backing materials with a lot of combinations of first and second colours that are different of each other. For the purpose of the present invention this means that the first colour can be distinguished form the second colour by the naked eye.

In a preferred embodiment the first colour is black and the second colour is grey.

In another preferred embodiment the first colour is white and the second colour is grey.

In still another preferred embodiment the first colour is black and the second colour is white.

Furthermore, the present invention pertains to a backing material comprising
a first side being the front side and comprising
  first monocomponent fibers having a cross-section or
  first multicomponent fibers comprising a first component having a cross-section said fibers being arranged in a first woven or nonwoven layer having a first colour and
a second side being the rear side and comprising
  second monocomponent fibers having a cross-section or
  second multicomponent fibers comprising of a first component having a cross-section
  said fibers being arranged in a second woven or nonwoven layer having a second colour being different from the first colour
and said second layer is integrated with said first layer,
wherein
i) said first colour has its origin in a first pigment or dyestuff exhibiting the first colour and
  iα) within said first monocomponent fibers said first colour is distributed over the whole cross-section of said first monocomponent fibers, and
  iβ) within said first multicomponent fibers said first colour is distributed at least over the whole cross-section of said first component of said first multicomponent fibers and
ii) said second colour has its origin in a second pigment or dyestuff exhibiting the second colour and
  iχ) within said second monocomponent fibers said second colour is distributed over the whole cross-section of said second monocomponent fibers and
  iδ) within said second multicomponent fibers said second colour is distributed at least over the whole cross-section of said first component of said second multicomponent fibers.

Within the scope of the present invention's backing material the term "fiber" has to be understood in its broadest sense, including mono- or multifilaments, which might be spun bond or melt blown or made by another technique known per se and which may have any cross-sectional shape, e.g. a spherical shape, a tri- or multilobal shape or a rectangular shape the latter exhibiting a width and a height, wherein the width may be considerably larger than the height, so that the fiber in this embodiment is a tape. Said fibers may be comminuted for example by cutting or ripping to form staple fibers of a suitable length for backing materials.

In the embodiment iα) the backing material of the present invention comprises first monocomponent fibers and within said first monocomponent fibers said first colour is distributed over the whole cross-section of said first monocomponent fibers. Within the scope of the present invention's backing material this means, that the first colour and therefore, the pigment particles or dyestuff molecules, which are the origin of the first colour, are distributed over the whole cross-section of said first monocomponent fibers. This clearly excludes embodiments, wherein pigment particles or dyestuff molecules are merely present at the surface of said mono-component fibers.

First monocomponent fibers belonging to embodiment iα) of the backing material according to the present invention, which have the first colour distributed over their whole cross-section, can be produced by known spun-dyeing processes. If, for example said first monocomponent fibers are manufactured from a melt or from a solution of a first polymer, a first pigment or dyestuff is mixed with said first polymer solution or melt and the resulting mixture is melt-spun or solution-spun to yield spun-dyed first monocomponent fibers having the first colour, which colour—as a consequence of the mixture of the first polymer with the first pigment or dyestuff—is distributed over the whole cross-section of said first monocomponent fibers.

In the embodiment iχ) the backing material of the present invention comprises second monocomponent fibers and within said second monocomponent fibers said second colour is distributed over the whole cross-section of said second monocomponent fibers. Within the scope of the present invention's backing material this means, that the second colour and therefore, the pigment particles or dye-stuff molecules, which are the origin of the second colour, are distributed over the whole cross-section of said second monocomponent fibers. This clearly excludes embodiments, wherein pigment particles or dyestuff molecules are merely present at the surface of said monocomponent fibers.

Second monocomponent fibers belonging to embodiment iχ) of the backing material according to the present invention, which have the second colour distributed over their whole cross-section, can be produced by known spun-dyeing processes. If, for example said second monocomponent fibers are manufactured from a melt or from a solution of a second polymer—which may be same as the first polymer or which maybe different from the first polymer—a second pigment or dyestuff is mixed with said second polymer solution or melt and the resulting mixture is melt-spun or solution-spun to yield spun-dyed second monocomponent fibers having the second colour, which colour—as a consequence of the mixture of the second polymer with the second pigment or dyestuff—is distributed over the whole cross-section of said second monocomponent fibers.

In the embodiment iβ) the backing material of the present invention comprises first multicomponent fibers and within said first multicomponent fibers said first colour is distributed at least over the whole cross-section of said first component of said first multicomponent fibers. Within the scope of the present invention's backing material this means, that the first colour and therefore, the pigment particles or dyestuff molecules, which are the origin of the frist colour, are distributed at least over the whole cross-section of said first component of said first multicomponent fibers. This clearly excludes embodiments, wherein pigment particles or dyestuff molecules are merely present at the surface of said first component of said multi-component fibers.

However, embodiment iβ) includes embodiments, wherein the first colour is distributed only over the whole cross-section of the first component of the first multi-component fibers.

Furthermore, embodiment iβ) includes embodiments, wherein the first colour is distributed only over the whole cross-section
    of the second or
    of the third or
    of any higher
component of the first multicomponent fibers.

And embodiment iβ) includes embodiments, wherein the first colour is distributed over the whole cross-section
    of any two or
    of any three or
    of all
components of the first multicomponent fibers.

First multicomponent fibers belonging to embodiment iβ) of the backing material according to the present invention, which have the first colour distributed at least over the whole cross-section of their first component, can be produced by known spun-dyeing processes in the same manner as described for the monocomponent fibers having the first color, but with the difference, that as much solutions or melts of polymers have to be prepared as equals the number of the components of the multicomponent fiber to be manufactured, and that the first pigment or dyestuff is mixed with the desired melt(s) or solution(s). The resulting first colour containing melt(s) or solution(s) and the corresponding non-coloured melt(s) or solution(s) are then subjected to any known multicomponent spinning process to yield spun-dyed first multicomponent fibers having the first colour, which colour—as a consequence of the mixture of the desired polymer(s) in the desired melt(s) or solution(s) with the first pigment or dyestuff—is distributed over the whole cross-section of the desired component(s) of said first multicomponent fibers.

In the embodiment iδ) the backing material of the present invention comprises second multicomponent fibers and within said second multicomponent fibers said second colour is distributed at least over the whole cross-section of said first component of said second multicomponent fibers. Regarding the scope of embodiment iδ) and regarding the production of said second multicomponent fibers analogously the same applies as explained for embodiment iβ).

In preferred embodiments iβ) and iδ) the backing material of the present invention comprises bicomponent first and second fibers, respectively, having a first and second colour, respectively, which is distributed over the whole cross-section
    either of the first component
    or of the second component
    or of the first and second component
of said first and second bicomponent fibers, respectively.

Said bicomponent fibers may have any known bicomponent structure, wherein the first and second components of the bicomponent fibers are arranged for example side-by-side, or the first component forms islands in a sea of the second component or in an especially preferred embodiment the first component forms the core and the second component forms the sheath of a core/sheath-structure and all, what was said in describing the process according to the present invention with respect to suitable polymers and melting temperatures for the core and for the sheath, respectively, applies in an analogous manner to the bicomponent first and second fibers, respectively of the present invention's backing material.

Such first and second bicomponent fibers can be produced by known spun-dyeing processes as described above for the monocomponent fibers, but with the modification, that the pigment or dyestuff is mixed with the melt or solution of that polymer, that according to the embodiments iβ) and iδ) is designated to form a certain component of the resulting bicomponent fiber. Consequently, in the resulting bicomponent fiber the pigment or dyestuff is distributed over the whole cross-section of said certain component(s).

To arrive at the backing material according to the present invention, the fibers having the first colour are arranged in a first layer, the fibers having the second colour are arranged in a second layer, and finally said first and second layer are integrated by any suitable method to yield the inventive backing material.

If, for example the first and second layer comprises fibers made from thermoplastic polymers, a suitable method for integration may be thermal bonding. If, for example only one or none of said first or second layer comprises fibers made from thermoplastic polymers, suitable methods may be gluing, needling or stitching.

In a preferred embodiment of the backing material according to the present invention the first layer is a nonwoven layer and the second layer is a nonwoven layer, wherein the first layer may be a first twirled web layer consisting of first spun-dyed fibers, and the second layer may be a second twirled web layer consisting of second spun-dyed fibers, and wherein the second twirled web layer is twirled onto and thereby integrated with the first twirled web layer by thermal bonding. Depending on the intended uses the resulting nonwoven/nonwoven-backing material may be used as such, or two or more of such backing materials may be manufactured and stapled onto one another resulting in a stapled backing material with the proviso, that the resulting stapled backing material exhibits the first nonwoven layer having the first colour on its front side and the second nonwoven layer having the second layer on its rear side.

In a further preferred embodiment of the backing material according to the present invention the first layer is a nonwoven layer and the second layer is a woven layer, wherein the first layer may be a first twirled web layer consisting of first spun-dyed fibers and the second layer may be a woven layer consisting of second spun-dyed thermoplastic fibers, and wherein first the twirled web layer is twirled onto and thereby integrated with the second woven layer by thermal bonding or integrated by other known integration techniques like needling, stitching or gluing. Depending on the intended uses the resulting nonwoven/woven-backing material may be used as such, or two or more of such backing materials may be manufactured and stapled onto one another resulting in a stapled backing material with the proviso, that the resulting stapled backing material exhibits the first nonwoven layer having the first colour on its front side and the second woven layer having the second layer on its rear side.

In another preferred embodiment of the backing material according to the present invention the first layer is a woven layer and the second layer is a woven layer, wherein the first layer may be a woven layer consisting of first spun-dyed thermoplastic fibers and the second layer may be a woven layer consisting of second spun-dyed thermoplastic fibers, and wherein the first woven layer is integrated with the second woven layer by thermal bonding or integrated by other known integration techniques like needling, stitching or gluing. Depending on the intended uses the resulting woven/woven-backing material may be used as such, or two or more of such backing materials may be manufactured and stapled onto one another resulting in a stapled backing material with the proviso, that the resulting stapled backing material exhibits the first woven layer having the first colour on its front side and the second woven layer having the second layer on its rear side.

The backing material according to the present invention, which—among other technical features—comprises a first side exhibiting a first colour and a second side exhibiting a second colour, wherein the first colour is different from the second colour, the first side is the front side and the second side is the rear side is excellently suited to be provided in step a) of the process according to the present invention and thereby serves to replace the labour-intensive and time-consuming process of the prior art to manufacture tufted backing materials with different colours.

The backing material according to the present invention can be used advantageously to manufacture filters for technical or medical applications, because the first and second colour immediately allows to decide which side has to become the permeate side and which side has to become the retentate side. This ensures the optimal technical function of the filter
  in technical applications such as filtering of dust, carbon-particulate matter, pollen or grasses or in separating a hydrophilic fluid, e.g. water, from a hydrophobic fluid, e.g. aviation fuel and in
  in medical applications such as filtering bacteria and viruses.

Furthermore, a tufted backing material comprising the backing material according to the present invention, which backing material is tufted from the front side or from the rear side with a tufting material is part of the present invention, too. As the tufting material any suitable tufting material may be used, e.g. those tufting materials, which were already mentioned as preferred ones during the description of the process according to the present invention.

The tufted backing material according to the present invention can be used advantageously to manufacture tufted carpets for home textiles or for decoration or for textiles in automobiles, trains or aircrafts or for out door applications like synthetic turf or play grounds.

Furthermore, said tufted backing material according to the present invention can also be used advantageously to manufacture molded carpets.

The invention claimed is:

1. A process to manufacture tufted backing materials comprising:
   a) providing a roll bearing a backing material, the backing material comprising a first side exhibiting a first color and a second side exhibiting a second color, wherein the first color is different from the second color, the first side is the front side and the second side is the rear side,
   b) unwinding the backing material from the roll in a first unwinding direction and guiding the backing material into a tufting device provided with tufting means, so that the first side exhibiting the first color faces the tufting means of the tufting device,
   c) tufting the backing material with the tufting means of the tufting device until a desired amount of a tufted backing material provided with tufts extending from the second side exhibiting the second color has been manufactured,
   d) cutting the backing material at a position between the roll bearing the backing material and the tufting device,
   e) rotating the roll bearing the backing material by an angle of 180° so that the first side exhibiting the first color is the rear side and the second side exhibiting the second color is the front side,
   f) unwinding the backing material from the roll in a second unwinding direction which is opposite to the first unwinding direction and guiding the backing material into the tufting device provided with tufting means, so that the second side exhibiting the second color faces the tufting means of the tufting device, and
   g) tufting the backing material with the tufting means of the tufting device until a desired amount of a tufted backing material provided with tufts extending from the first side exhibiting the first color has been manufactured.

2. The process according to claim 1, wherein the backing material comprises at least one layer of a nonwoven.

3. The process according to claim 2, wherein the nonwoven comprises bicomponent fibers.

4. The process according to claim 3, wherein the bicomponent fibers are core/sheath fibers.

5. The process according to claim 4, wherein the core comprises a thermoplastic polymer selected from the group consisting of polyethyleneterephthalate (PET), polypropylene (PP), polyamide (PA), polybutyleneterephthalate (PBT), polytrimethyleneterephthalate (PTT), polyphenylenesulfide (PPS), polyethylenenaphthalate (PEN), polyethyleneimide (PEI), polylactic acid (PLA) and polyoxymethylene (POM).

6. The process according to claim 4, wherein the sheath comprises a thermoplastic polymer selected from the group consisting of polyamide (PA), polypropylene (PP), polyethylene (PE) or copolymers thereof, polybutyleneterephthalate (PBT), polylactic acid (PLA) and aliphatic polyesters.

7. The process according to claim 4, wherein the bicomponent fibers comprise a core of polyethyleneterephthalate and a sheath of polyamide or of polypropylene.

8. The process according to claim 1, wherein the first color is black and the second color is grey.

9. The process according to claim 1, wherein the first color is white and the second color is grey.

10. The process according to claim 1, wherein the first color is black and the second color is white.

* * * * *